United States Patent [19]
Morikawa

[11] Patent Number: 5,871,796
[45] Date of Patent: Feb. 16, 1999

[54] METHOD AND APPARATUS FOR FORMING A CONTINUOUS DOUGH STRIP OF A CONSTANT WIDTH

[75] Inventor: Michio Morikawa, Utsunomiya, Japan

[73] Assignee: Rheon Automatic Machinery Co., Ltd., Japan

[21] Appl. No.: 979,189

[22] Filed: Nov. 26, 1997

[30] Foreign Application Priority Data

Nov. 29, 1996 [JP] Japan .................................. 8-334867

[51] Int. Cl.⁶ .............................. A21C 9/00; A21D 8/00
[52] U.S. Cl. .................... 426/502; 425/145; 425/297; 425/311; 425/373; 426/503; 426/517
[58] Field of Search .................................. 426/503, 496, 426/502, 517, 518; 425/145, 296, 297, 311, 373, 308, 310

[56] References Cited

U.S. PATENT DOCUMENTS

| | | |
|---|---|---|
| 4,883,417 | 11/1989 | Morickawa et al. ..................... 425/297 |
| 4,902,524 | 2/1990 | Morikawa et al. ..................... 426/503 |
| 5,158,792 | 10/1992 | Morikawa et al. ..................... 426/503 |

FOREIGN PATENT DOCUMENTS 63-245631  10/1988  Japan .

*Primary Examiner*—George Yeung
*Attorney, Agent, or Firm*—Brinks Hofer Gilson & Lione

[57] ABSTRACT

An apparatus is provided for dividing a long dough mass into dough portions, each of which has a predetermined length, and forming a continuous dough strip from the respective dough portions. A first transporter transports the long dough mass that exceeds the predetermined length along a first conveying path. The first transporter includes a rotary cutter for dividing the long dough mass into a plurality of dough portions each having the predetermined length. A second transporter receives the dough portions from the first transporter and transports them along a second conveying path. The first and second conveying paths are arranged so that the predetermined length of each respective dough portion extends in a direction substantially parallel to the direction of the width of the continuous strip. A joining device receives the dough portions and joins them to form the continuous dough strip.

20 Claims, 4 Drawing Sheets

METHOD AND APPARATUS FOR FORMING A CONTINUOUS DOUGH STRIP OF A CONSTANT WIDTH

FIELD OF THE INVENTION

This invention generally relates to forming a continuous dough strip for producing food products such as breads, cakes, confectionery or the like. More particularly, this invention relates to a method and apparatus for dividing a long dough mass into a plurality of laterally cut dough portions to be fed sideways, and for joining the fed dough portions to form a continuous dough strip with a substantially constant thickness and width over its full length.

BACKGROUND OF THE INVENTION

Dough, as used in a known machine for producing bread, confectionery, or the like, often takes the form of a continuous strip. In a process for forming the continuous dough strip and for dividing the strip into smaller portions to produce food products, a production lot in one cycle of the process is a continuous dough strip of a certain length or a number of products produced from a dough mass supplied in one cycle.

In the border between a preceding and a following supplied dough mass there are various and unavoidable losses, e.g., the loss caused by a border of an irregular shape and the loss caused by the waiting time for the following dough mass, etc., which generate various disadvantages.

Such disadvantages have led to the use of a method and apparatus exemplified in Japanese Patent Early-Publication No. 63-245631 (corresponding to U.S. Pat. Nos. 4,883,417 and 4,902,524, issued to Morikawa et al.), assigned to the same assignee of the present application, in which a long dough mass is divided into a plurality of dough portions, which are then caused to overlap and join in series to form a continuous dough strip.

The disadvantage of such prior art, however, is that a border between the preceding long dough mass and the following long dough mass cannot be properly joined. The border often has a narrow width or uneven thickness or both as compared to the remainder of the dough strip. Thus, the border tends to generate the losses, and this has been a problem in producing a continuous dough strip.

It is thus necessary to design a process, and to construct an apparatus which, when forming a continuous dough strip by joining a plurality of dough portions, will provide means for smoothly and properly joining dough portions and for forming a continuous dough strip with a substantially constant width.

SUMMARY OF THE INVENTION

In view of the foregoing, it is the primary object of the invention to provide a stable supply of continuous dough strips, each of which is formed by joining a plurality of dough portions end-to-end. The dough strip produced by the present invention has a constant width and thickness, and properly joined borders.

One object of the present invention is to provide an apparatus for dividing a long dough mass into dough portions which each have a predetermined length, and for forming a continuous dough strip from the respective dough portions. The apparatus includes a first means which receives a long dough mass to be cut into a predetermined length from the storage means and which transports the long dough mass along a first conveying path. The first means includes means for dividing the long dough mass into a plurality of dough portions each having a predetermined length. The apparatus further includes a second means which receives the dough portions from the first means and which transports the dough portions along a second conveying path, wherein the first and second conveying paths are arranged so that the predetermined length of the respective dough portions on the second conveying path extends in a direction generally parallel to the width direction of the dough mass on the first conveying path. The apparatus further includes joining means that receives the dough portions from the second means and that joins them to form a continuous dough strip from the dough portions.

The continuous dough strip formed from the invention of the apparatus has a substantially constant width which corresponds to the divided length of each dough portion in an axial direction on the first means.

Preferably, the apparatus further comprises means for changing a level of the first means.

In accordance with the illustrated and preferred embodiment, the first means includes a conveying belt entrained on at least one roll having a rotary axis. In this case, the dividing means may include a rotary cutter, located at the front area of the conveying belt, having a rotary axis substantially parallel to the rotary axis of the roll, whereby the rotary cutter is rotated so that it is alternately in contact with and retracted from the conveying belt.

In the preferred embodiment, the second means also includes a conveying belt, wherein the direction of travel of the conveying belt of the second means makes a certain angle with the direction of travel of the conveying belt of the first means. The certain angle may be substantially a right angle.

A sensor may be disposed on the second means for detecting whether the dough portion is located on the second means.

Preferably, the apparatus further comprises means for equalizing the thickness of any overlapping area between the preceding dough portion and the following dough portion. This equalizing means may comprise a roll.

In accordance with one embodiment, the apparatus further comprises means for controlling the supply rate of the dough portions from the second means to the joining means.

The apparatus may further comprise a third means, for receiving the continuous strip from the joining means and for transporting the continuous strip to a following processing stage.

In another aspect of the invention an apparatus is provided that comprises a first means for receiving a long dough mass that has a much greater length than a predetermined length and for transporting the long dough mass along a first conveying path, said first means including a first dividing means for dividing the long dough mass into a plurality of first dough portions; a second means for receiving the first dough portions from said first means and transporting the first dough portions along a second conveying path, said second means including a second dividing means for dividing the first dough portions into a plurality of second dough portions each having a predetermined length, wherein the first and second conveying paths are arranged so that the predetermined length of the respective dough portions on the second conveying path extends in a direction generally parallel to the direction of the width of the dough mass on the first conveying path; and joining means for receiving the second dough portions from said second means and for joining them to form a continuous strip from the respective second dough portions.

Another object of the present invention is to provide a method for dividing a long dough mass into a plurality of dough portions each having a predetermined length and forming a continuous strip from the respective dough portions. In this method, a long dough mass that exceeds a predetermined length is transported along a first conveying path and divided into a plurality of dough portions each having a predetermined length. The divided dough portions are transported along a second conveying path, wherein the first and second conveying paths are arranged so that the predetermined length of the respective dough portions extends in a direction generally parallel to the width direction of the dough portions on the first conveying path. The transported dough portions are joined to form a continuous strip.

The above and other related objects and features of the present invention will be apparent from a reading of the following description of the disclosures found in the accompanying drawings.

DETAILED DESCRIPTION OF THE PREFERRED EMBODIMENTS

Figure 1:
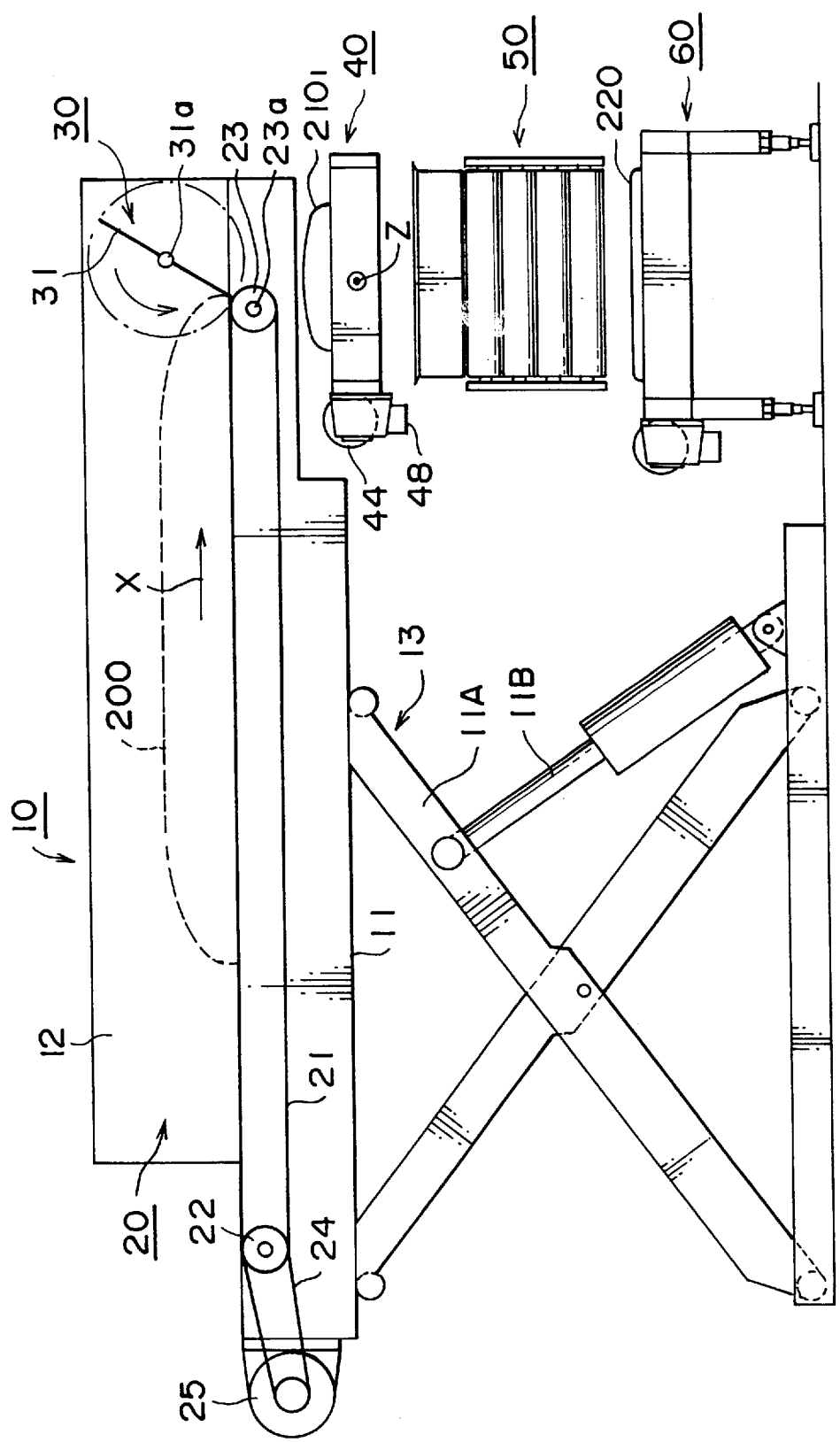
FIG. 1 is a front view of an apparatus according to the first embodiment of the present invention.

FIG. 1 shows a supplying and joining apparatus 100 of the present invention, which includes a storage section 10, a cutter unit 30, a dough joining device 50, and first, second, and third transporters 20, 40, and 60. This apparatus 100 receives a kneaded long dough mass 200 prepared by a conventional kneading device 80 (shown in FIG. 2). The long dough mass 200 is for producing breads, cakes, confectionery, or the like.

The storage section 10, which stores the kneaded long dough mass 200 received from the kneading device 80 (FIG. 2), is defined by a frame 11, and walls 12 which extend from the periphery of the frame. A lifting device 13, which is provided for elevating the storage section 10, comprises arms 11A slidably connected to each other and pivotally connected to the bottom of the frame 11 and a piston cylinder mechanism 11B which is operatively connected to an arm 11A.

Alternatively, the piston cylinder mechanism 11B of the lifting device 13 may be replaced by other means, as, for example, a mechanical jack or the like.

The first transporter 20, for supporting and transporting the dough 200 from the storage section 10, is a horizontal belt-type conveyor system that includes a first continuous belt 21 entrained around a driver roll 22 and an idler roll 23, which are mounted on the frame 11. A motor 25 is drivingly connected to the driver roll 22 through a transmission chain 24 so as to convey the dough 200 along a first transport direction designated by an arrow X.

The cutter unit 30 is provided on the downstream end in the first transport direction X of the first transporter 20. The cutter unit 30 has a rotary cutter 31 that rotates about an axis 31a and that is driven by a motor 32. The cutter axis 31a of the rotary cutter 31 is positioned substantially parallel to a rotary axis 23a of the idler roll 23 so that the cutter 31 is rotated to come into contact with and to retract from the first belt 21. An edge of a blade of the cutter 31 is rotated to contact the surface of the first belt 21 and to cut the long dough mass 200 which passes through the cutter unit 30 into a plurality of divided dough portions $210_1, 210_2, \ldots 210_{n-1}, 210_n$, each of which has a predetermined length. The added numbers $1, 2, \ldots n-1, n$ denote sequential positive integers. However, in the drawings, only one portion $210_1$, and only two portions $210_1, 210_2$ are illustrated, in FIGS. 1 and 2, respectively. These portions are made to in turn fall from the forward end of the conveyor 21 onto the second transporter 40.

The rotary cutter blade of the cutter unit 30 may be replaced by other types of blades such as a blade movable up and down. In all cases, it is preferable that the cutting length of the dough portion by the cutter unit 30 be variable, in order to produce various kinds of products.

Figure 2:
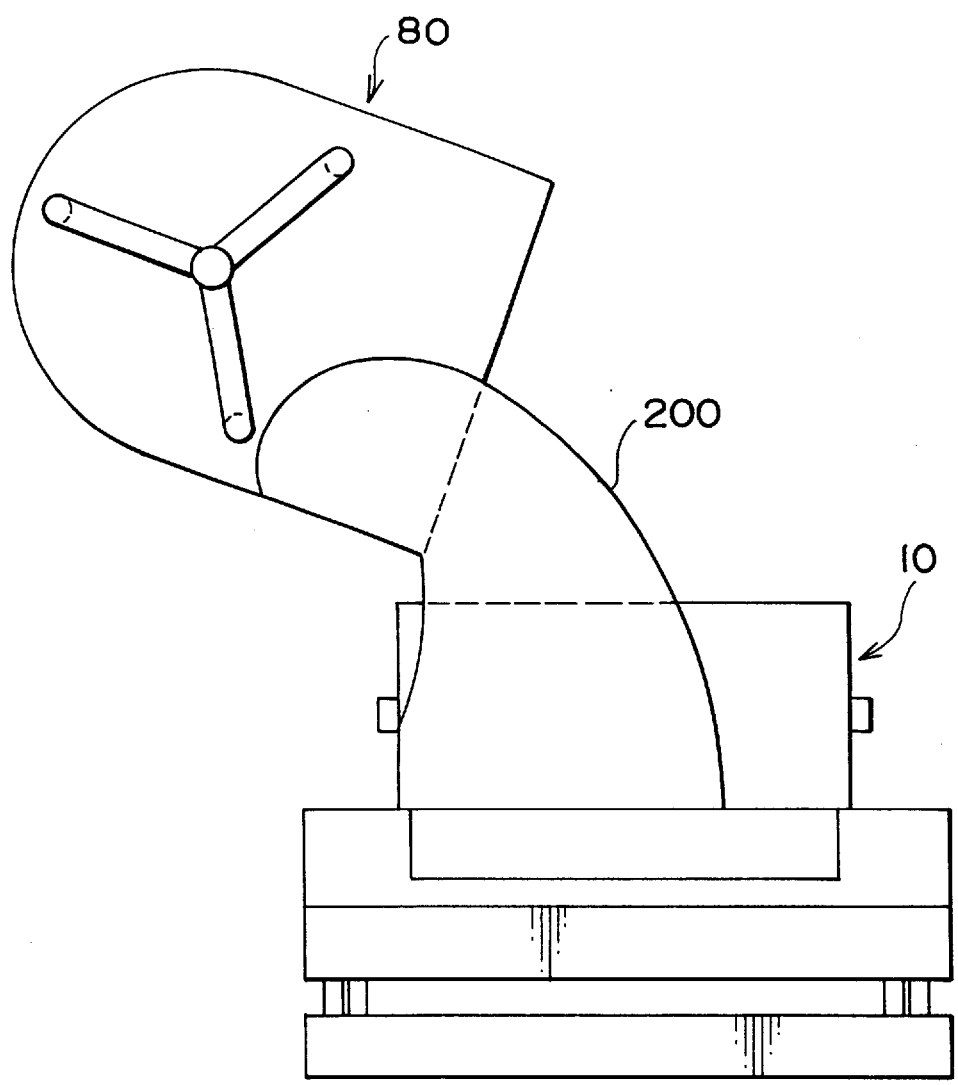
FIG. 2 is a side view of a kneading device used in the embodiment of FIG. 1, and a side view of a storage section of the apparatus.
Figure 3:
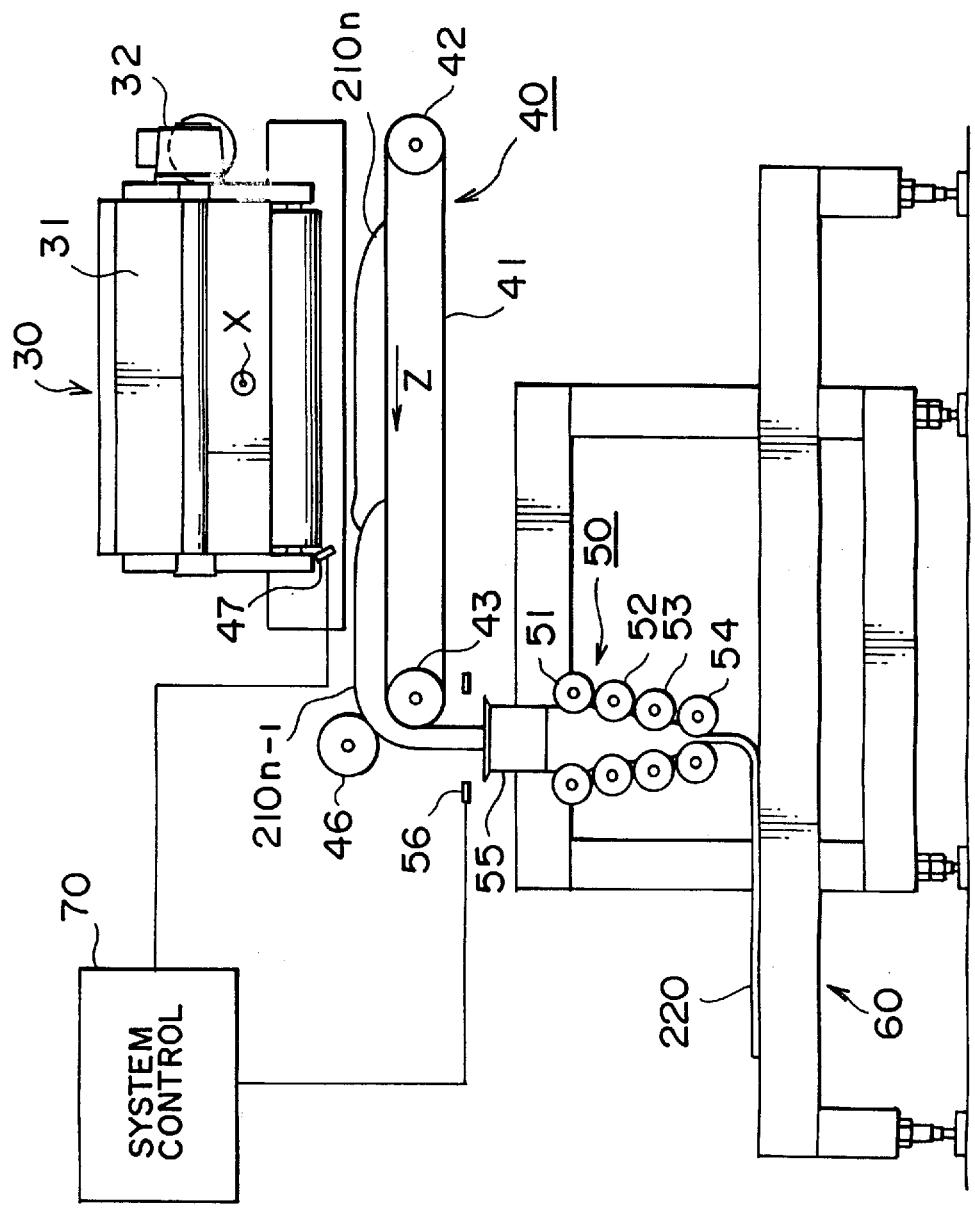
FIG. 3 is a side view of the apparatus according to FIG. 1.

Best shown in FIG. 3, the second transporter 40, which receives the dough portions $210_1, 210_2, \ldots 210_{n-1}$, and $210_n$ from the cutter unit 30, is provided under the cutter unit 30. The second transporter 40 is also a horizontal belt-type conveyor system which is similar from a mechanical standpoint to the first transporter 20. The second transporter 40 includes a second frame-supported continuous belt 41 entrained around a driver roll 42 and an idler roll 43. The driver roll 42 is driven by a motor 44 (shown in FIG. 1, but not FIG. 2). The second belt 41, which is oriented by the rotation of the motor 44, is to feed the dough portions to the joining device 50.

The second transport direction (designated by the arrow Z) of the second belt 41 of the second transporter 40 is substantially orthogonal to the first direction X of the first belt 21 of the first transporter 20. When the long dough mass is moved on the first belt 21, it is moved in the direction X, which is the axial direction of the long dough mass. Then it divided into the predetermined length in the direction X, after which the divided portions are moved in the direction Z, which runs in the direction of the width of the long dough mass 200. The orientation of the long dough mass 200 in the direction X on the first conveyor 21 is changed by substantially right angles in the direction Z on the second conveyor 41, since the two transport directions X and Z are orthogonal to each other.

The joining device 50 includes pairs of joining members 51, 52, and 53 and 54 for joining the plurality of divided and separated dough pieces $210_1, \ldots, 210_2, 210_{n-1}$, and $210_n$. In this embodiment, the joining members are four pairs of opposite rolls arranged to form a V-shaped or flared path therebetween and rotate in such a direction so as to guide the dough pieces that are inside the path downward. Cylindrical rolls, as well as polygonal rolls, may be used as the joining members 51–54. Alternatively, a plurality of opposite belts arranged to form the V-shaped path therebetween may be used.

Provided above the joining device 50 is a guide 55 for stabilizing the entry of the dough portions into the slot of the joining device 50. Preferably, the interior walls of the guide 55 have a small roller or rollers for reducing friction between the dough and these walls.

FIG. 3 shows that the divided dough portions are gripped, pressed, vibrated, and fed to a bottom opening of the joining device 50 by the opposite rolls 51–54. This pressing contact of the dough portions between the rolls causes the adjacent dough portions to be joined to a continuous dough strip 220 of a constant thickness and width. The strip 220 can keep a constant width over its full length since each of the supplied dough portions has a constant width. The width of the strip 220 can be easily changed to a desired one by varying the length of the dough to be cut by the cutter unit 30.

The third transporter 60. which receives the continuous dough strip 220 from the joining device 50 and transfers the strip to the following work station (not shown), is provided under the joining device 50.

In reference to FIGS. 1 and 2, the storage section 10 is vertically movable between its initial or lower position in which the piston cylinder mechanism 11B is contracted (FIG. 2) and its higher position in which the piston cylinder mechanism 11B is extended (FIG. 1). The storage section 10 receives the long dough mass A at the lower position in FIG. 2 from the kneading device 80. As shown in FIG. 1, the storage section 10 at its higher position supplies the divided dough A1 to the second transporter 40. The level of the second belt 41 can be adjusted so that the dough portions fall at the correct position on the second belt to facilitate the conveying of the dough portions downstream. The level of the higher position can preferably be adjusted so as to change the falling height for the dough portions.

The relationship between the conveying directions of the first and second transporters 20 and 40 is not limited to the orthogonal one. An angle formed between the conveying directions of the first and second transporters 20 and 40 may have a range which can change the orientations of the dough to the conveying directions X and Z.

With reference to FIG. 3, positioned in a space between the cutter unit 30 and the second transporter 40, in close proximity to the second belt 41 is a dough sensing device 47 connected to a system control 70. The dough portions that have been cut by the cutter unit 30 move downstream on the belt 41 to the dough sensing device 47, which senses the dough being present in an area on the belt 41 and under the sensing device 47. The timing of the transfer of the dough portions from the cutter unit 30 to the second transporter 40 is controlled by signals generated from the sensing device 47. When the sensing device 47 senses that one preceding dough portion has moved downstream on the belt 41 out of the area, the sensing device sends control signals to the first transporter 20 and cutter unit 30 through the control 70 so as to carry out the transfer of the following dough portions from the cutter unit to the second transporter 40.

Preferably, the extent of any overlap between the preceding dough portion and the following one may be controlled by adjusting the timing of the transfer of the dough portion from the cutter unit 30 to the second transporter 40 with the control 70.

Provided downstream of the second belt 41 is a pressure roll 46 for equalizing the thickness of any overlapping and adjacent dough portions. The roll 46 rotates in contact with the adjacent dough portions on the second belt 41 and equalizes the overlapping portions to a constant thickness. The equalized adjacent dough portions can be preliminarily joined at their overlapping portions by the pressure of the roll 46. Such preliminarily joined overlapping portions will further be sufficiently joined in the joining device 50.

The installation as illustrated in FIG. 3 may also include a sensor 56. which is located near the entrance of the joining device 50. The sensor 56 detects the incoming dough portions and is connected to the system control 70. With the sensor 56 an oversupply or undersupply of the dough may be monitored by detecting the dough remaining in the joining device 50 or a slack of the incoming dough. The sensor 56 may generate signals corresponding to the detected information and transmit them to the system control 70. The control 70 may use the signals to control the second belt 41 by varying the speed of the belt 41 or to intermittently drive it to supply the dough properly.

Figure 4:
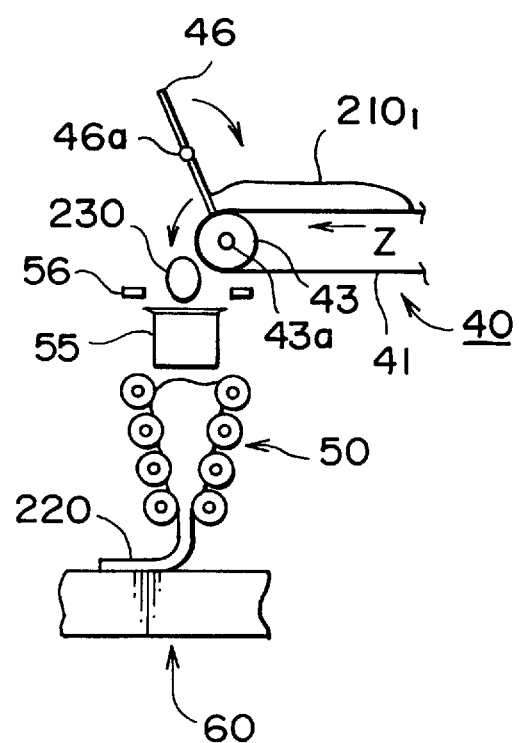
FIG. 4 is a partial side view of an apparatus according to the second embodiment of the present invention, illustrating a second rotary cutter and a joining device.

FIG. 4 shows another embodiment of the invention. Each of the divided dough portions $210_1, 210_2, \ldots, 210_{n-1}, 210_n$ (only one dough portion $210_1$ is shown in FIG. 4 ) that has the predetermined length may be further divided into a plurality of small dough pieces 230 having a shorter length, if necessary. For this purpose, this embodiment has a second rotary cutter 46 driven by a motor (not shown). A cutter axis 46a of the cutter 46 is substantially parallel to a rotary axis 43a of the idler roll 43 so that the cutter 46 alternately contacts, and retracts from, the second belt 41. An edge of a blade of the cutter 46 is rotated to come in contact at intervals with the surface of the second belt 41, and it cuts the dough portion $210_1$. The cut dough piece 230 drops into the joining device 50 and is joined with other thus-cut dough pieces to form a continuous dough strip.

The forgoing discussion discloses and describes merely exemplary apparatuses, methods, and embodiments of the present invention. As will be understood by those familiar with the art, this invention may take other specific forms without departing from the spirit or essential characteristics thereof. Accordingly, the disclosures of the present invention are intended to be illustrative, but not limiting, of the scope of the invention, which is set forth in the following claims.

What is claimed is:

1. An apparatus for dividing a long dough mass into a plurality of dough portions each having a predetermined length and forming a continuous dough strip from the dough portions, comprising:

first means for receiving the long dough mass and for transporting the long dough mass along a first conveying path, said first means including means for dividing the long dough mass into a plurality of dough portions each having a predetermined length;

second means for receiving the dough portions from said first means and transporting the dough portions along a second conveying path, wherein the first and second conveying paths are arranged so that the length of each dough portion extends substantially parallel to the width direction of the continuous dough strip; and joining means for receiving the dough portions from said second means and for joining them to form the continuous dough strip.

2. An apparatus as recited in claim 1 further comprising means for changing a level of said first means.

3. An apparatus as recited in claim 1 wherein said first means further includes a first conveying belt entrained on at least one roll having a rotary axis.

4. An apparatus as recited in claim 3 wherein said dividing means includes a rotary cutter, located at the front area of said first conveying belt, having an axis substantially parallel to the rotary axis of said roll, said rotary cutter being rotated so that it alternately comes in contact with and retracts from said first conveying belt.

5. An apparatus as recited in claim 3 wherein said second means includes a second conveying belt, wherein an imaginary line along the traveling direction of said second conveying belt makes a certain angle with an imaginary line along the traveling direction of said first conveying belt of said first means.

6. An apparatus as recited in claim 5 wherein said certain angle is substantially a right angle.

7. An apparatus as recited in claim 1 wherein a sensor is disposed on said second means for detecting whether the dough portion is located on said second means.

8. An apparatus as recited in claim 1 further comprising means for equalizing the thickness of any overlapping area between a preceding dough portion and a following dough portion.

9. An apparatus as recited in claim 8 wherein said equalizing means comprises a roll.

10. An apparatus as recited in claim 1 further comprising means for controlling the supply rate of the dough portions from said second means to said joining means.

11. An apparatus as recited in claim 1 further comprising third means for receiving said continuous dough strip from said joining means and for transporting the continuous dough strip to the following processing stage.

12. An apparatus for dividing a long dough mass into a plurality of dough portions each having a predetermined length and forming a continuous dough strip from the dough portions, comprising:

first means for receiving the long dough mass and for transporting the long dough mass along a first conveying path, said first means including first dividing means for dividing the long dough mass into a plurality of first dough portions;

second means for receiving the first dough portions from said first means and transporting the first dough portions along a second conveying path, said second means including second dividing means for dividing the first dough portions into a plurality of second dough portions each having a predetermined length, wherein the first and second conveying paths are arranged so that the length of the dough portions extends substantially parallel to the width direction of the continuous dough strip; and joining means for receiving the second dough portions from said second means and for joining them to form the continuous dough strip.

13. A method for a dividing a long dough mass into a plurality of dough portions each having a predetermined length and forming a continuous dough strip from the dough portions, comprising the steps of:

receiving the stored long dough mass and transporting the long dough mass along a first conveying path and dividing the long dough mass into a plurality of dough portions each having a predetermined length;

receiving the divided dough portions and transporting the dough portions along a second conveying path, wherein the first and second conveying paths are arranged so that the length of each of the dough portions extends in a direction substantially parallel to the width direction of the continuous dough strip; and receiving the transported dough portions and joining them to form the continuous dough strip.

14. A method as recited in claim 13 further comprising a step of changing a level of the first conveying path.

15. A method as recited in claim 13 wherein the first conveying path makes a certain angle with the second conveying path.

16. A method as recited in claim 15 wherein said certain angle is substantially a right angle.

17. A method as recited in claim 13 further comprising a step of detecting whether the dough portion is located on said second conveying path.

18. A method as recited in claim 13 further comprising a step of equalizing the thickness of any overlapping area between a preceding dough portion and a following dough portion.

19. A method as recited in claim 13 further comprising a step of controlling the supply rate of the dough portion on the second conveying path.

20. A method as recited in claim 13 further comprising a step of transporting the continuous dough strip to the following processing stage.

\* \* \* \* \*

UNITED STATES PATENT AND TRADEMARK OFFICE
CERTIFICATE OF CORRECTION

PATENT NO. :     5,871,796
DATED      :     February 16, 1999
INVENTOR(S) :    Michio Morikawa It is certified that error appears in the above-indentified patent and that said Letters Patent is hereby corrected as shown below:

On the Title Page

Item [56], line 1, under "U.S. PATENT DOCUMENTS" replace "Morickawa" with --Morikawa--.

In the Claims

In claim 13, line 1, delete "a" (first occurrence).

Signed and Sealed this

Twenty-seventh Day of July, 1999

Attest:

Q. TODD DICKINSON

*Attesting Officer*    *Acting Commissioner of Patents and Trademarks*